(12) United States Patent
Johnson

(10) Patent No.: US 7,830,882 B2
(45) Date of Patent: Nov. 9, 2010

(54) SWITCH SCALING FOR VIRTUALIZED NETWORK INTERFACE CONTROLLERS

(75) Inventor: Erik J. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 750 days.

(21) Appl. No.: 11/601,114

(22) Filed: Nov. 17, 2006

(65) Prior Publication Data

US 2008/0117909 A1    May 22, 2008

(51) Int. Cl.
*H04L 12/56* (2006.01)
(52) U.S. Cl. ........................ 370/392; 370/419; 709/238
(58) Field of Classification Search ........................ None
See application file for complete search history.

(56) References Cited

U.S. PATENT DOCUMENTS

| | | | |
|---|---|---|---|
| 6,735,198 B1 * | 5/2004 | Edsall et al. | 370/389 |
| 6,868,086 B1 | 3/2005 | Putzolu et al. | |
| 7,113,487 B1 | 9/2006 | Johnson et al. | |
| 7,480,303 B1 * | 1/2009 | Ngai | 370/395.5 |
| 2004/0210678 A1 * | 10/2004 | Pettey et al. | 710/1 |
| 2005/0182853 A1 * | 8/2005 | Lewites et al. | 709/238 |
| 2006/0064523 A1 * | 3/2006 | Moriki et al. | 710/62 |
| 2007/0116049 A1 * | 5/2007 | Johnson et al. | 370/468 |
| 2008/0002663 A1 * | 1/2008 | Tripathi et al. | 370/351 |
| 2008/0002701 A1 * | 1/2008 | Droux et al. | 370/392 |
| 2008/0002736 A1 * | 1/2008 | Droux et al. | 370/463 |
| 2008/0005441 A1 * | 1/2008 | Droux et al. | 710/306 |

OTHER PUBLICATIONS

Intel Corporation and WMware; "Improving IT Management with Multi-port NICs and a Virtual Infrastructure".; White Paper, 2005.; pp. 8; http://www.intel.com/network/connectivity/resources/doc_library/white_papers/intel_vmware_wp.pdf. Cite last visited on Nov. 17, 2006.
Ajay V. Bhatt, "Creating a PCI Express Interconnect", Technology and Research Labs, Intel Corporation, White Paper, 2002., pp. 8,; http://www.pcisig.com/specifications/pciexpress/resources/PCI_Express_White_Paper.pdf cite last visited Nov. 17, 2006.
PCI Express, Base Specification Revision 1.1. Mar. 28, 2005, pp. 1-126.

* cited by examiner

*Primary Examiner*—Daniel J Ryman
*Assistant Examiner*—Brian Roberts
(74) *Attorney, Agent, or Firm*—Caroline M. Fleming

(57) ABSTRACT

A system bus may be used as an inter-switch communications link to transfer packets between virtualized interfaces on different virtualized network interface controllers that are accessible by a plurality of virtual machines. The inter-switch communications link may also be used for advanced power management through the use of intelligent packet redirection when virtualized interfaces are lightly utilized.

22 Claims, 5 Drawing Sheets

SWITCH SCALING FOR VIRTUALIZED NETWORK INTERFACE CONTROLLERS

FIELD

This disclosure relates to a virtualized system having a plurality of virtual interfaces and in particular to transferring packets between virtual interfaces.

BACKGROUND

A computer system is a layered device that includes a hardware layer, a firmware and operating system layer, and an applications program layer. The hardware layer of the computer system is often referred to as a physical platform. The platform may include processors, chipsets, communications channels, memory, boards and systems. Typically, a single operating system controls all hardware layer resources in the computer system.

A virtual machine is one of a number of discrete identical execution environments in a computer system. Each virtual machine may execute an operating system and is isolated from the other virtual machines so that each virtual machine appears to a user to "own" all the hardware resources of the computer system. Typically, a virtual machine monitor (VMM), sometimes referred to as a virtual machine manager, provides the capability to share the computer system's hardware resources among the virtual machines. In some systems, a virtual machine monitor may simulate the complete hardware or partially simulate some of the hardware. In other systems, instead of simulating hardware, the virtual machine monitor may provide access to the hardware resources through an Applications Programming Interface (API). Thus, through the use of VMM, one physical platform can function as multiple "virtual" machines.

The physical platform may include a Network Interface Controller (Card) (NIC) which is a device for transmitting and receiving packets. Virtualization of network interfaces, and NICs in particular, is performed by presenting a single physical NIC as two or more Virtual Interfaces (VIFs).

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
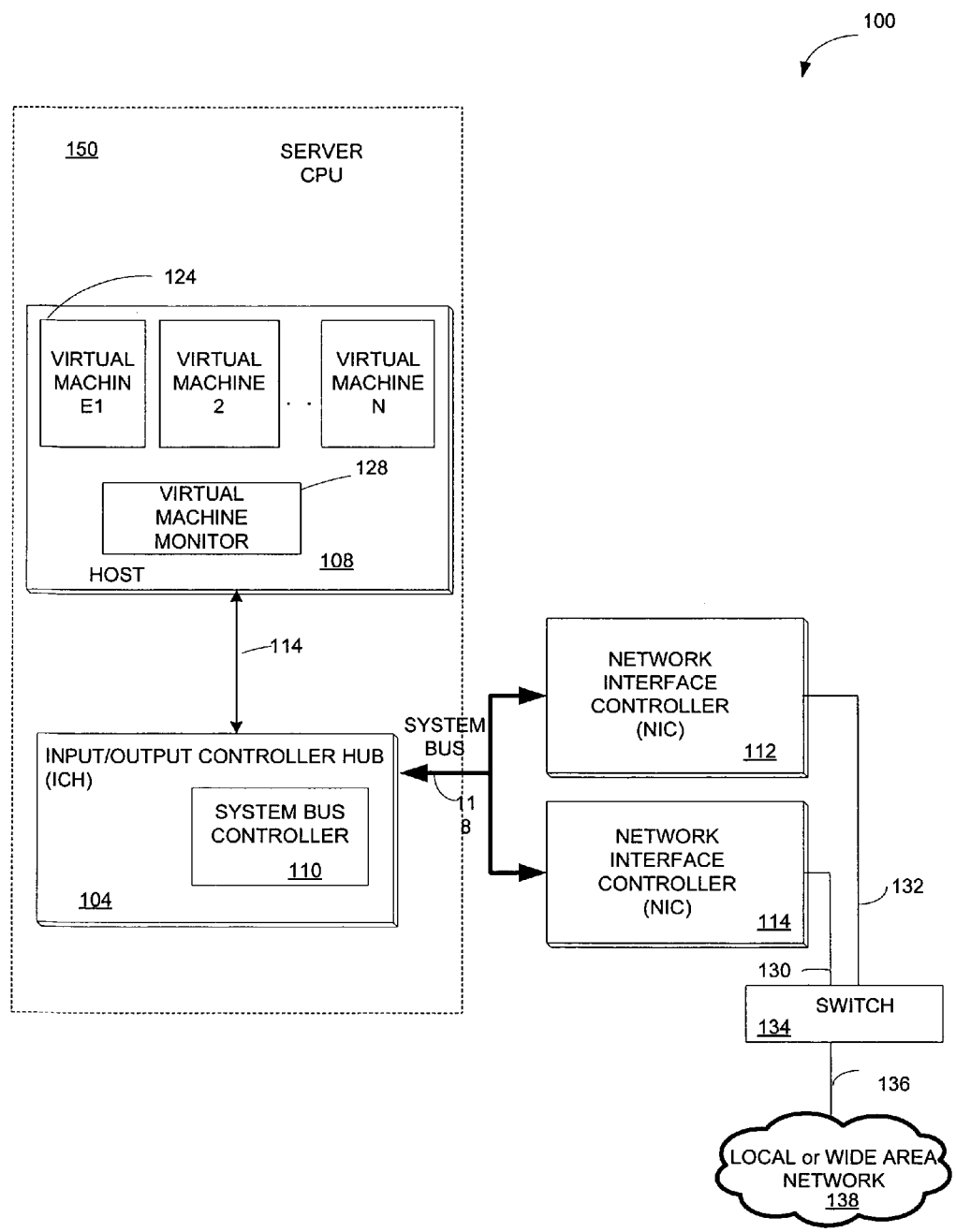
FIG. 1 is a block diagram of a system that includes an embodiment of a virtualized network interface controller (NIC) according to the principles of the present invention.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A plurality of virtual interfaces (VIFs) in a virtualized Network Interface Controller (card) (NIC) allow a plurality of virtual machines to concurrently "own" the same physical resource, that is, a single physical network port interface. In one embodiment, a system with two virtual machines may be configured as a datacenter with one of the virtual machines dedicated to a web sever and the other virtual machine dedicated to a database server. Each virtual machine may be associated with a respective one of the VIFs in the virtualized NIC, with both VIFs sharing the same physical network port interface.

There may be instances in which the web server may need to communicate with the database server. For example, the web server may need to forward a request to the database server to retrieve an "image" identified by a Uniform Resource Locator (URL) which is stored in a database managed by the database server. The physical network port interface in the virtualized NIC may be coupled to an external switch or bridge allowing packets to be forwarded over a network. However, in this example, the request from the web server to the database server must be sent and returned through the same network physical network port interface. Typically, network protocols, for example, the Institute of Electrical and Electronics Engineers (IEEE) 802.1 working group bridging protocols, do not allow a switch to forward a packet out of the same port through which the packet is received.

Thus, to allow data transfer between VIFS that share a physical network port interface a virtualized NIC may include an embedded switch for switching (bridging) packets between VIFs in the virtualized NIC. A web server request received at an ingress port in the embedded switch from a first VIF may be forwarded by the embedded switch in the virtualized NIC through an egress port through another VIF to the database server. However, in a system with more than one virtualized NIC, with each virtualized NIC processing network traffic (packets, frames) for one or more virtual interfaces, even with each virtualized NIC having an embedded switch, an additional switch (external to the virtualized NICs) is still needed. The external switch allows traffic to be switched between a first VIF in a first virtualized NIC to a second VIF in a second virtualized NIC.

A packet that is received through one VIF in a virtualized NIC directed to another VIF in the virtualized NIC is switched through the embedded switch in the virtualized NIC. However, packets received through a VIF in a first virtualized NIC for a VIF in a second virtualized NIC are directed through the external switch and may enter the second virtualized NIC from the external switch in a seemingly-random fashion. The path through the external switch which is required to bridge data from a VIF on a first virtualized NIC to a VIF on a second virtualized NIC in the same platform adds asymmetry of latencies between VIFs in a single system. The asymmetry of latencies occurs because some packets stay on platform (switched through the embedded switch) while others leave and re-enter the platform through the external switch.

In an embodiment of the present invention an inter-switch communications link (path) is provided to allow virtualized NICs to be teamed. The inter-switch communications link allows packets to be transferred directly between the virtualized NICs, thus reducing the asymmetry of latencies between VIFs on a platform.

FIG. 1 is a block diagram of a system 100 that includes an embodiment of a virtualized network interface controller (NIC) 112, 114 according to the principles of the present invention. The system 100 includes a Server CPU 150 that includes a host 108, an I/O Controller Hub (ICH) 104 and virtualized NICs 112, 114.

The host 108 may include any one or more of a plurality of processors such as a single core Intel® Pentium IV® processor, a single core Intel Celeron processor, an ® XScale processor or a multi-core processor such as Intel® Pentium D, Intel® Xeon® processor, or Intel® Core® Duo processor or any other type of processors.

The host 108 may also include memory such as Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the host 108 using a high speed chip-to-chip interconnect 114 such as Direct Media Interface (DMI). DMI supports 2 Gigabit/second concurrent transfer rates via two unidirectional lanes.

The ICH 104 may include a system bus controller 110 for controlling communication with devices, for example, NICs 112, 114 coupled to the ICH 104 that communicate with the ICH over system bus 118. In one embodiment the system bus may be the Peripheral Component Interconnect (PCI) or the Peripheral Component Interconnect Express (PCI-e) bus. Each virtualized NIC 112, 114 may be coupled to the ICH 104 and to each other through the system bus 118.

In the embodiment shown, each virtualized NIC 112, 114 has a respective physical network port interface 130, 132 to allow the virtualized NIC 112, 114 to communicate with an external (off-platform) switch 134. The external switch has another network port 136 that allows the external switch 134 to be coupled to a Local or Wide Area Network (LAN or WAN) 138. Thus, each virtualized NIC 112, 114 may communicate through the switch 134 to remote devices (not shown) accessible via the LAN or WAN 138 using data-link protocols such as Ethernet, Token Ring or other protocols. The system bus 118, allows the virtualized NICs 112, 114 to be teamed by providing an inter-switch communications link between the virtualized NICs 112, 114.

The system 100 may support virtualization, that is, provide the ability to create separate execution environments that may be referred to as "virtual machines". Each virtual machine 124 is a discrete execution environment that runs an operating system. A virtual machine monitor (VMM) 128 allocates system (platform) resources such as memory to each virtual machine 124. The VMM 128 runs directly on the system's hardware and emulates a complete hardware environment for each virtual machine 124. The virtual machines 124 are not aware that they are sharing the system hardware.

Thus, with each virtual machine 124 having its own operating system, different applications and operating system combinations may be executed on the same system 100. For example, both 32-bit and 64-bit operating-systems may be provided in the system 100 allowing both 32-bit and 64-bit applications to run on the same system. Also, update and recovery tools may be restricted to one virtual machine 124 and virus-prone activities may be isolated by restricting them to one virtual machine 124 so that they will not infect the entire system.

For example, a portion of a managed computer system 100 may be isolated to perform system upgrades and maintenance without interrupting the end-user, or the same system 100 may function independently as both a business and a personal system, keeping software and virus attacks separate or virtual "partitions" may be created to isolate multiple user environments.

Figure 2:
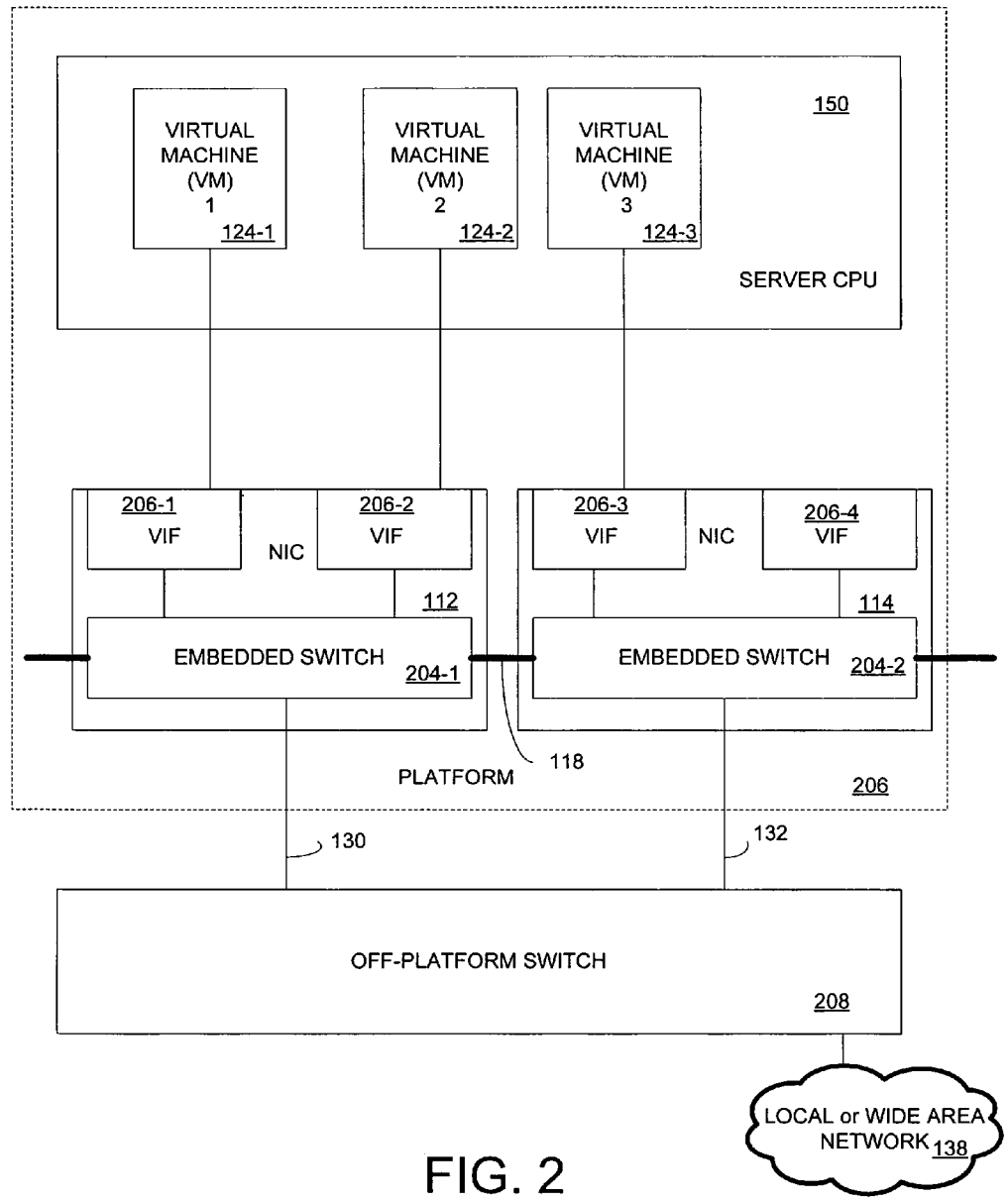
FIG. 2 is a block diagram illustrating the interface between virtual machines and virtualized NICs shown in FIG. 1.

FIG. 2 is a block diagram illustrating the interface between virtual machines 124 and virtualized NICs 112, 114 shown in FIG. 1. In the embodiment shown, virtualization of the respective physical network port interfaces 130, 132 in the virtualized NICs 112, 114 is performed by representing each physical network port interface 130, 132 in a respective NIC 112, 114 as two or more virtual interfaces (VIFs) 206-1 . . . 206-3. As shown virtualized NIC 112 has one physical network port interface 130 "owned" by VIFs 206-1, 206-2 and virtualized NIC 114 has one physical network port interface 132 "owned" by two VIFs 206-3, 206-4.

Each virtualized NIC 112, 114 may operate at the data link layer defined by the Open Systems Interface (OSI) reference model. Data link layer protocols include Ethernet and Token Ring. Each virtualized NIC 112, 114 includes a respective embedded switch 204-1, 204-2 that may also be referred to as a network bridge which operates at the data link layer of the OSI reference model to connect multiple network segments. Each embedded switch 204-1, 204-2 allows packets to be bridged between virtual machines 124-1 . . . 124-3 associated with the particular virtualized NIC 112, 114. In the embodiment shown, packets being transferred through VIF 206-1 or VIF 206-2 may be bridged between virtual machines 124-1 and 124-2 through embedded switch 204-1 in virtualized NIC 112.

The IEEE 802.1D standard defines the behavior of a bridge in an Ethernet network. The embedded switch 204-1, 204-2 forwards an incoming frame or packet based on the destination Media Access Control (MAC) address stored in a data link protocol header in the frame or packet. A MAC address (source or destination) is an OSI reference model data link layer address that is used, in this description, to identify the virtual machine that is the source or destination of a packet.

Each embedded switch 204-1, 204-2 may also include a bridging table which may also be referred to as a forwarding table. The bridging table stores MAC destination addresses and the corresponding port number in the switch through which a packet with that MAC destination address may be forwarded.

Each VIF 206-1 . . . 206-3 has a unique Media Access Control (MAC) address that may be stored in non-volatile memory in the virtualized NIC 112, 114. The MAC address is used to uniquely identify the VIF. Hence, each virtual machine associated with a VIF also has a unique MAC address.

NICs 112, 114 may be teamed for switch scaling and energy optimizations. Specifically, as shown in FIG. 1, when two virtualized NICs 112, 114 with embedded switches 204-1, 204-2 are in the same platform 206, a system bus 118 provides an on-platform inter-switch communications link between the embedded switches 204-1, 204-2. Thus, instead of transferring packets from a VIF 206-1 on one virtualized NIC 112 through the off-platform switch 208 to a VIF 206-3 on another virtualized NIC 114, these packets may be forwarded entirely on the platform 206 over system bus 118 between virtualized NIC 112 and virtualized NIC 114. In one embodiment, one or more ports in the embedded switches in the virtualized NICs 112, 114 may be used to forward packets over the system bus 118 between VIFs on different virtualized NICs 112, 114.

Although, in the embodiment shown, the platform 206 has two virtualized NICs 112, 114, the invention is not limited to a platform having two virtualized NICs. In other embodiments, the platform may include more than two virtualized NICs, with each virtualized NIC having a respective embedded switch.

In one embodiment the inter-switch communications link uses a system bus such as the Peripheral Component Interconnect Express (PCI-e) system bus. The PCI-e system bus is packet based, switched point to point with one host and root PCIe switch that allows device-to-device (endpoint-to-endpoint) communications.

Figure 3:
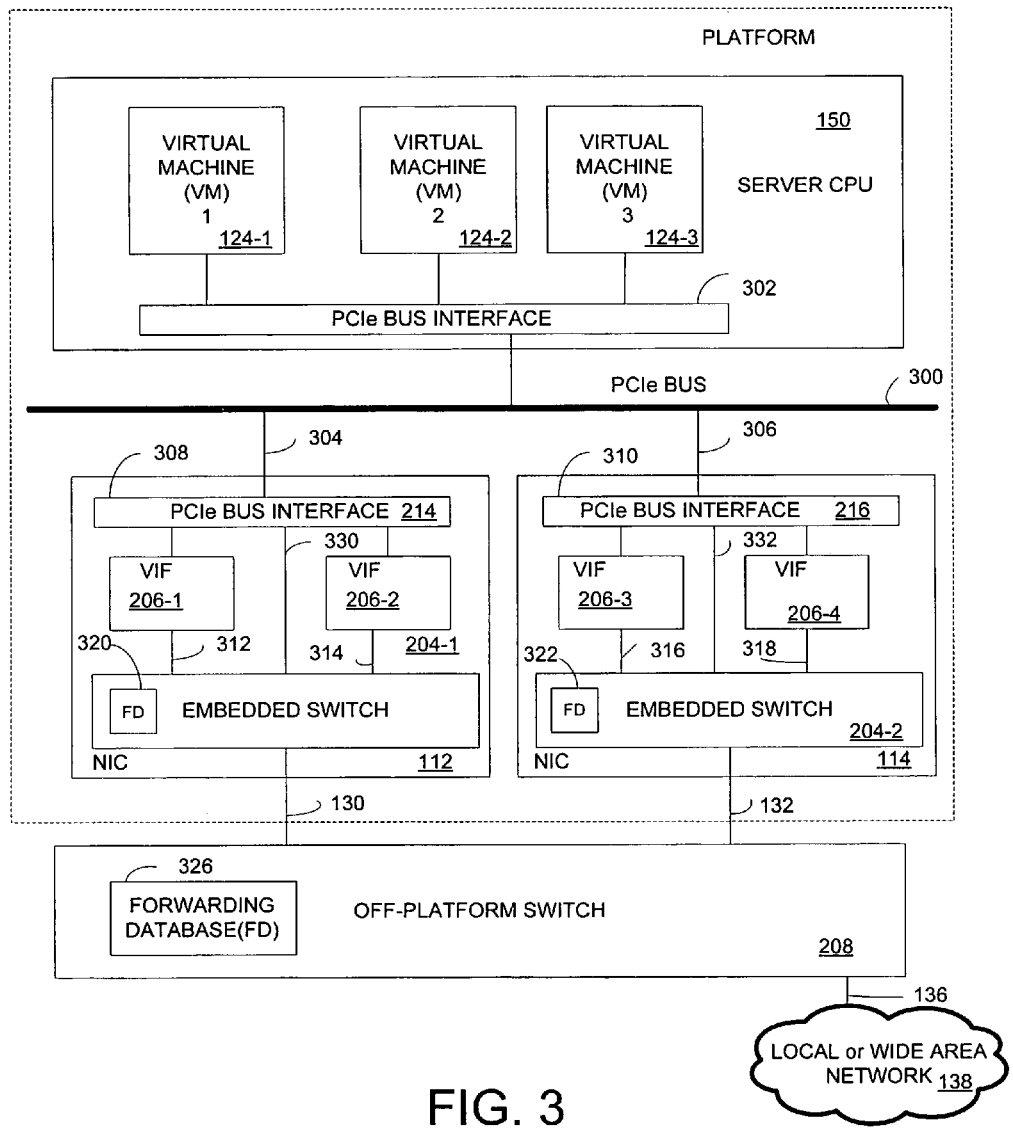
FIG. 3 is a block diagram illustrating an embodiment of an inter-switch communications link between virtualized NICs using a PCIe system bus.

FIG. 3 is a block diagram illustrating an embodiment of an inter-switch communications link between virtualized NICs using a PCIe system bus 300. In the embodiment shown, there are two virtualized NICs 112, 114 and each of the virtualized NICs 112, 114 includes a respective PCIe bus interface 214, 216 to provide an interface to the PCIe system bus 300. In the embodiment shown, the embedded switch 204-1, 204-2 includes inter-switch communication ports 330, 332 that are dedicated to interface with the PCIe system bus 300 that provides an inter-switch communications link between embedded switches 204-1, 204-2 in virtualized NICs 112, 114. The PCIe bus interfaces 214, 216 handle the transfer of packets over the PCIe bus 300 for the inter-switch communications link between virtualized NICs 112, 114. The PCIe Interface 308, 310 includes a transaction layer, a link layer and a physical layer. The transaction layer creates request packets for transmission to a link layer. The link layer adds a sequence number to the transaction layer packet. Upon receiving a packet, PCIe interface 308 extracts the Ethernet packet and forwards the Ethernet packet to the embedded switch. In one embodiment, the VIF and VM exchange packet descriptors that are encapsulated in PCIe transactions. The packet descriptors include pointers to the Ethernet packets that are stored in system memory.

The inter-switch communications link is an on-platform path between embedded switches 204-1, 204-2 in virtualized NICs 112, 114. In the embodiment shown, a packet is forwarded on inter-switch communications link between inter-switch communications port 330 in embedded switch 204-1 and inter-switch communications port 332 in embedded switch 204-2. As shown in the embodiment in FIG. 3, the inter-switch communications link includes a path through PCIe bus 300 and PCIe bus interfaces 214, 216 and PCIe bus ports 304, 306.

In an embodiment for an IEEE 802.1 network having a plurality of nodes and links connecting the nodes, a spanning tree protocol is typically used to prevent loops. For example, the spanning tree protocol described in the IEEE 802.1D standard is typically used to prevent loops by disabling links so that there is only one path between a source and a destination. In an embodiment using the IEEE 80.1D standard, bridge port priorities may be configured within the virtualized NICs so that the link between the physical network ports 210, 212 in the embedded switches 204-1, 204-2 over the PCIe bus 300 is not disabled.

In another IEEE 802.1 embodiment, there may be multiple shortest path spanning trees, with the root of each shortest path spanning tree in a respective embedded switch. In this embodiment, the inter-switch communications link between virtualized NICs 112, 114 is part of each virtualized NIC's shortest path spanning tree and is not disabled.

The PCI Express (PCIe) Base Specification Revision 1.1, Mar. 28, 2005 available from the PCI Special Interest Group (SIG) describes how data may be transferred between Input/Output (I/O) devices and a host over a PCIe link. A PCIe link includes two low-voltage, differentially driven pairs of signals: a transmit pair and a receive pair. The bandwidth of the PCIe link may be scaled by adding signal pairs to form multiple lanes. Read and write requests are transported to I/O devices using a packet-based protocol. In addition to providing communication between the host and I/O devices, PCI Express provides peer-to-peer communication between I/O devices, which are also referred to as endpoints. The inter-switch communications link between virtualized NICS 112, 114 may use the peer-to-peer communication described in the PCIe Base Specification to transfer data directly between the PCIe Interfaces of virtualized NICs 112, 114 over the PCIe bus 300.

In one embodiment the peer-to-peer communication may be provided through the use of memory commands that are defined by the PCIe bus protocol. An endpoint such as a virtualized NIC 112, 114, requests memory space and the endpoint may initiate and complete transactions in the memory space to another endpoint. These transactions use memory space to directly communicate between endpoints, that is, the transactions do not use system memory that may be in the server CPU 150. In an embodiment, the virtualized NIC 112, 114 from which a packet originates and the virtualized NIC 112, 114 to which a received packet is forwarded may be the endpoints for the peer-to-peer communication.

In another embodiment peer-to-peer communication may be provided by PCIe message transactions which may be vendor-specific. For example, an Ethernet packet or frame may be encapsulated in a PCIe message to transfer the Ethernet packet over the PCIe bus between virtualized NICs 112, 114. In one embodiment, upon determining that the Ethernet packet is to be forwarded through the inter-switch port, the Ethernet packet is forwarded back to PCI interface 308, encapsulated in the PCIe packet prior to forwarding over the PCI bus 300.

Benefits of this approach include lower latency for traffic flows between the VIFs 206-1 . . . 206-4 in a system 200, and ease of configuration. VIF-to-VIF latency is important for applications such as high-performance computing. In addition, fine tuning of the VM-to-VIF mappings based on traffic flow is not required because all VIF-to-VIF traffic flow stays on the platform 206. The elimination of the need for fine tuning results in a system that is easier to configure.

A VIF-to-VIF packet that is transferred over the inter-switch communications link has a higher latency than a packet transferred between VIFs in the same embedded switch. However, the latency is much lower than for a VIF-to-VIF packet that is transferred off-platform through the off-platform switch 208.

In one embodiment, all VIF off-platform traffic through VIFs 206-1 . . . 206-4 may be directed through one physical network port 130, 132 to off-platform switch 208. This, in turn, enables one or more of the remaining virtualized NICs to power down its physical interfaces. In the embodiment shown in FIG. 3, with all of the traffic being directed through virtualized NIC 114, the physical interface to physical network port 130 in virtualized NIC 112 may be powered down resulting in a corresponding reduction in energy consumption. In an embodiment in which a virtualized NIC 112, 114 communicates over an IEEE 802.1 network, standard Media Access Control (MAC) learning migration in IEEE 802.1 bridging enables traffic for the VIFs to be properly routed to the powered-up NIC port(s) 130, 132.

Typically, a switch may learn the location of network devices that are coupled to the switch as packets are received. For example, upon receiving a packet from a first port, the switch extracts a source address stored in a header included with the data in the packet. In the case of an Ethernet data packet, the source address may be the Media Access Control (MAC) address. A MAC address is a 48-bit serial number assigned to an accessible network device that may be stored in non-volatile memory. The MAC address is used by the OSI link layer. The extracted MAC source address may be stored in a bridging table also referred to as a forwarding database 320, 322 in the embedded switch 204-1, 204-2 in an entry in the bridging table 320, 322 that also stores the port number of the embedded switch through which the packet was received. Thus, the embedded switch may learn the switch port through which a device associated with the MAC address may be accessed. The learned MAC addresses stored in the bridging table in the embedded switch allow the embedded switch to determine through which port a packet is to be forwarded.

In order to determine the port through which to forward a received packet, a MAC destination address also stored in the header of the packet is extracted and used to perform a lookup of the bridging table 320, 322 to search for an entry associated for the MAC destination address. If a match is found in the bridging table 320, 322, the packet is forwarded through the switch port in the embedded switch 204-1, 204-2 associated with the MAC address that is stored in an entry in the bridging table 330, 332. If no match is found, the packet is flooded to all ports of the switch except for the port the packet was received on.

Figure 4:
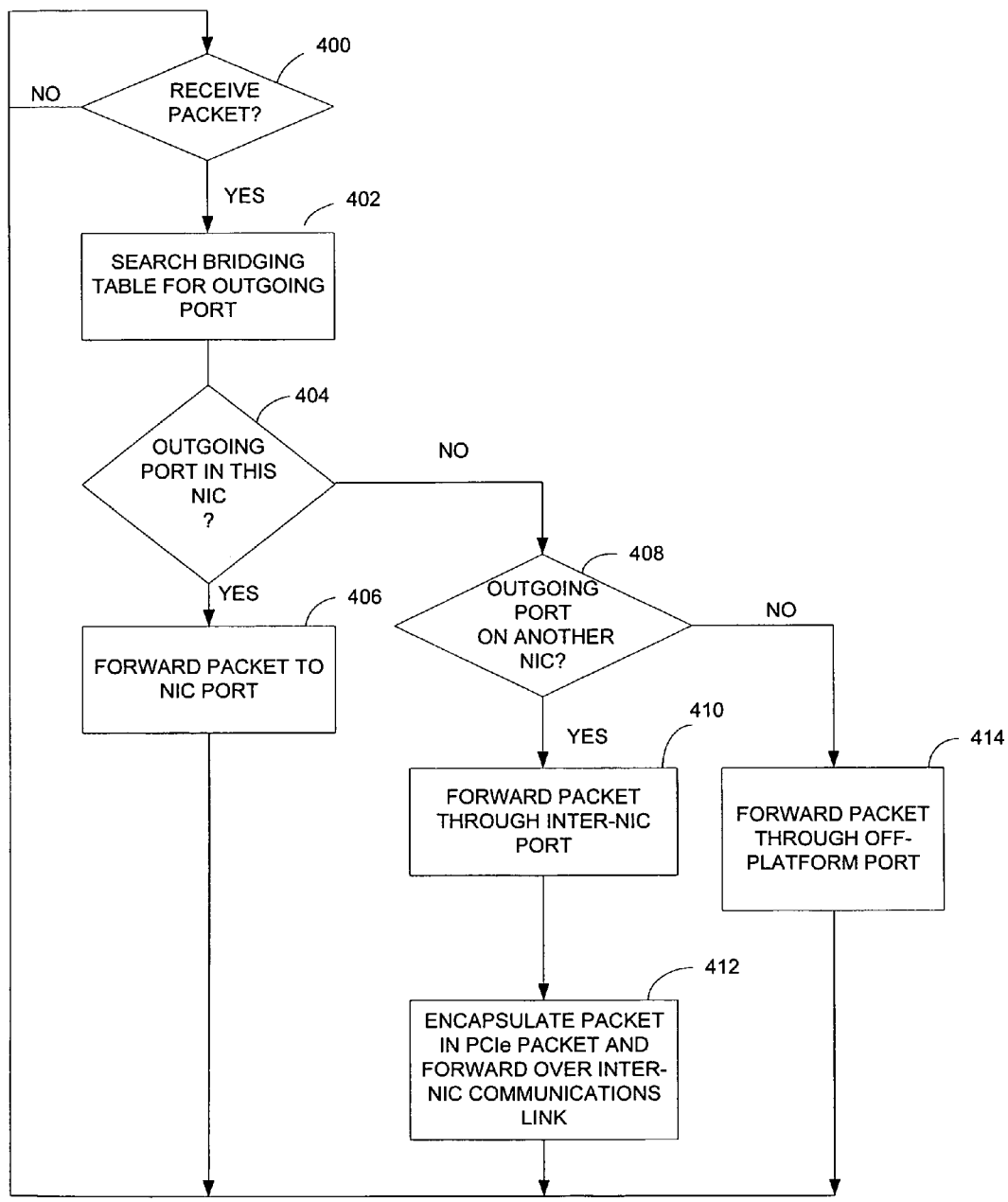
FIG. 4 is a flow graph that illustrates an embodiment of a method for forwarding packets between virtualized interfaces according to the principles of the present invention.

FIG. 4 is a flow graph that illustrates an embodiment of a method for forwarding packets between virtualized interfaces according to the principles of the present invention. The flow graph assumes that that the addresses of all devices accessible through the embedded switch 204-1, 204-2 are already known (that is, have been learned or configured as static learned entries in the bridging table) and each address has an associated entry stored in a bridging table 320, 322.

As discussed in conjunction with FIG. 3, each embedded switch 204-1, 204-2 includes a respective bridging table 320, 322 to store forwarding entries, with each forwarding entry storing a MAC address and a switch port number associated with the MAC address.

At block 400, if a packet is received on any of the ports in the embedded switch 204-1, 204-2, processing continues with block 402. If not, processing continues with block 400 waiting for a packet to be received through anyone of the switch ports.

At block 402, a packet has been received on one of the switch ports. The MAC destination address is extracted from a data link layer header in the received packet to determine the switch port through which the packet is to be forwarded. In one embodiment, the packet is an Ethernet or IEEE 802.3 packet and the MAC destination address is extracted from the MAC header in the packet. The bridging table (forwarding database) 320, 322 in the embedded switch 204-1, 204-2 is searched for an entry that stores the extracted MAC address. If the extracted MAC address is stored in the bridging table 320, 322, the switch port number associated with the extracted MAC address is retrieved from the entry. If there is no matching entry in the bridging table 320, 322 and the MAC source address of the packet is unknown, the source address may be learned by adding an entry to the bridging table to store the MAC address together with the number of the switch port through which the packet was received. If there is no matching entry, the packet is flooded to all ports of the switch except for the receiving port.

At block 404, the embedded switch 204-1, 204-2 includes a plurality of ports. A switch port may be used to transfer packets to a VIF, an off-platform switch or an inter-switch communications link. Referring to FIG. 3, in the embodiment shown, embedded switch 204-1 has four ports, port 312 for transferring packets to/from VIF 206-1, port 314 for transferring packets for VIF 206-2, port 330 for transferring packets over inter-switch communications link and port 130 for transferring packets to/from the off-platform switch 208. Each VIF 206-1, 206-2 has an associated MAC address which is included in packets sourced and destined for the virtual machine 124-1, 124-2 associated with the VIF 206-1, 206-2.

The MAC destination address extracted from the received packet is used to determine the switch through which the received packet is to be forwarded. If the received packet is to be transferred through a switch port to a VIF on the same virtualized NIC, processing continues with block 406. If not, processing continues with block 408.

At block 406, the received packet is forwarded to a VIF 206-1, 206-2 through the switch port specified in the bridging table 320, 322. Processing continues with block 400 to wait for the next packet to be received by the embedded switch 204-1, 204-2.

At block 408, if the received packet is to be forwarded to a VIF 206-3, 206-4 on another virtualized NIC 114, processing continues with block 410. If the received packet is to be forwarded through the off-platform switch, processing continues with block 414.

At block 410, the packet is forwarded through the inter-switch port 330 to the PCIe interface 214 to be transferred over the PCIe bus 300 to the other virtualized NIC 114. Processing continues with block 412.

At block 412, the PCIe interface 214 encapsulates the packet in a PCIe formatted packet to be forwarded over a peer-to-peer link between virtualized NICs 112, 114. Methods for forwarding PCIe formatted packets over a PCIe bus 300 are described in the PCIe bus specification. Processing continues with block 400 to wait for another received packet.

At block 414, the packet is forwarded through the off-platform port 130 to the off-platform switch 208 to an off-platform network device that is accessible through the off-platform switch. Processing continues with block 400 to wait for another received packet.

Thus, the embedded switch 204-1, 204-2 and peer-to-peer link between virtualized NICs 112, 114 allows packets destined for on-platform devices such as virtual machines 124-1 . . . 124-3 to be forwarded on-platform.

In an embodiment as shown in FIG. 3 with more than one virtualized NIC 112, 114, energy optimization may be provided through the use of intelligent packet redirection when the virtualized interfaces are lightly utilized. Energy optimization may be provided by redirecting packets through a particular virtualized NIC 112, 114 to allow a physical network interface on another virtualized NIC to be powered-down. For example, a transmitter and/or receiver in a physical network port interface may be powered-down and/or other components in the virtualized NIC may be powered-down or put in a low-power sleep state. Methods for powering down or placing components in a low-power sleep state are known to those skilled in the art. In the embodiment shown, when one of the physical network ports 130, 132 is powered down, all VIF traffic in a system is routed through the other physical network port 130, 132.

Figure 5:
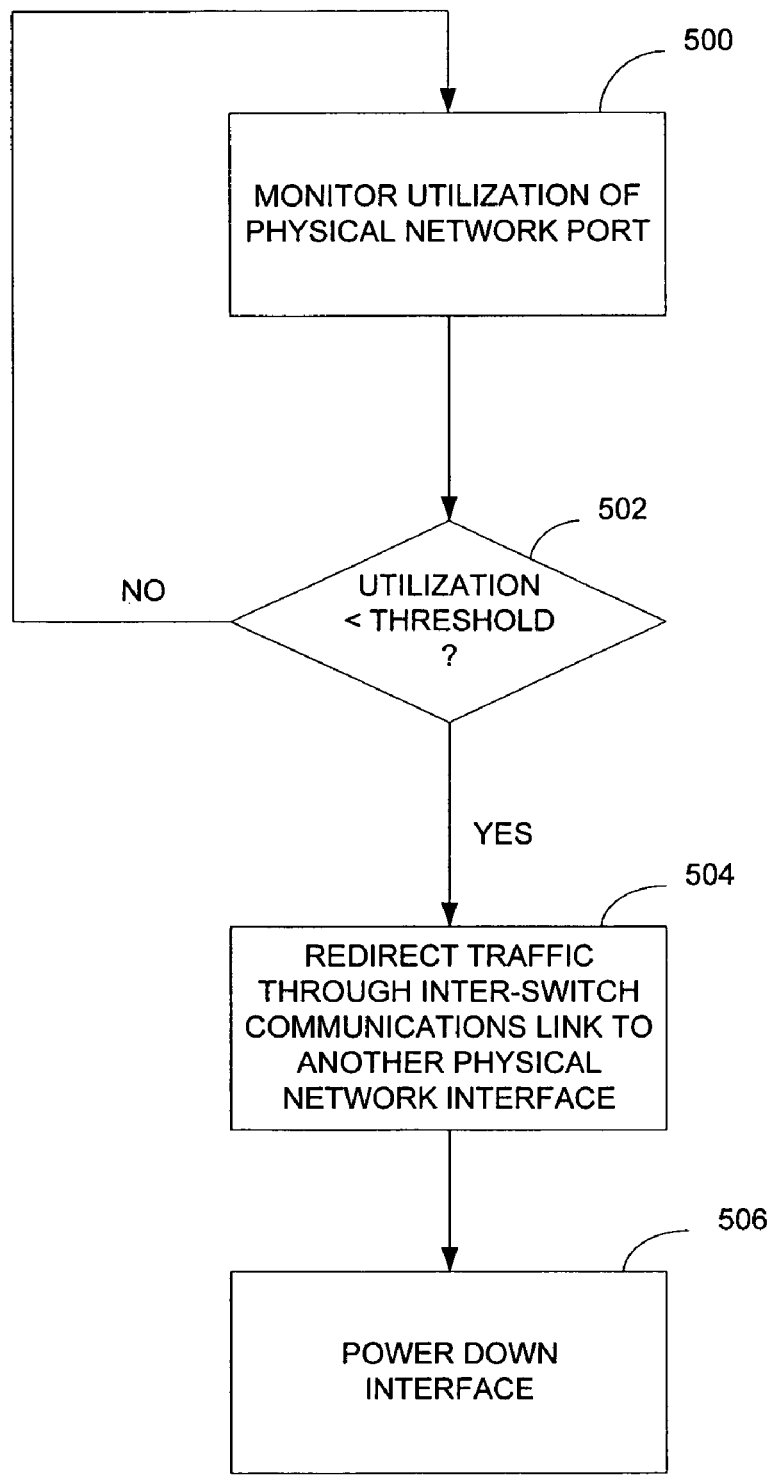
FIG. 5 is a flow graph that illustrates an embodiment of a method for energy optimization that may be used in the system shown in FIG. 3.

FIG. 5 is a flow graph illustrating an embodiment of a method for energy optimization that may be used in the system shown in FIG. 3.

At block 500, the utilization of the physical network port is monitored. For example, the incoming and outgoing traffic through the physical network port interface may be monitored. Processing continues with block 502.

At block 502, if the utilization of the physical network port is below a threshold, the physical network port interface may be powered down to reduce energy consumption. In one embodiment, the packet rate (number of packets per second) falling below a threshold may trigger a power down of the physical network port interface. In another embodiment, a bit rate (number of bits transmitted per second) falling below a threshold may trigger a power down of the physical network port interface. Processing continues with block 504, if the utilization is below the threshold. If not, processing continues with block 500 to monitor the traffic through the physical network port interface.

At block 504, outgoing traffic for the physical network port interface is re-directed through the inter-switch communications link to another physical network port interface. In one embodiment, entries in the bridging table 320, 322 (FIG. 3) in the respective embedded switch 204-1, 204-2 (FIG. 3) are modified so that outgoing packets that would have been directed to the powered-down physical network port interface are redirected. Processing continues with block 506.

At block 506, after the packets are redirected, the physical network port interface is powered down. In one embodiment, a power consumer transmitter and/or receiver in the physical network port interface may be powered-down and/or other components in the virtualized NIC may be powered-down or put in a low-power sleep state. Methods for powering down or placing components in a low-power sleep state are known to those skilled in the art.

As discussed earlier, the bridging tables 320, 322 in the embedded switches 204-1, 204-2 are data link layer tables that include entries, with each entry storing a MAC address and a switch port through which a packet may be forwarded to the MAC address. The bridging table 320, 322 may be searched to locate a switch port associated with a MAC address in order to determine the switch port through which the packet should be forwarded.

When a physical network port interface is powered down, the associated bridging table 320, 322 is updated by modifying the entries for switch port associated with the physical network port to forward these packets to the inter-switch communications port while the physical network interface port is powered down. A bridging table 326 in the off-platform switch 208 may automatically update the entries through a bridge learning process which is described in the IEEE 802.1 bridging specification.

Upon determining that the utilization of the physical network port is above the threshold, the powered-down physical network port interface may be powered on and the associated bridging table 320, 322 updated to re-direct traffic (packets) through the powered-on physical network port interface. Thus, the inter-switch communications path provides power efficiency optimization by allowing traffic for powered-down physical network ports 130 132 to be redirected through another physical network port 130, 132 during low traffic periods.

An embodiment has been described for an inter-switch communications link that uses the PCIe bus protocol to transfer network packets directly between embedded switches in virtualized NICs. However, the invention is not limited to the PCIe bus protocol. An embodiment may use any bus protocol that allows device-to-device (peer-to-peer) communication to transfer data directly between devices.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   a first network interface card comprising:
      a plurality of virtual interfaces to share a physical network interface, each virtual interface associated with a virtual machine; and
      a switch including an inter-switch communications port, the switch to receive a packet from one of the plurality of virtual interfaces through a virtual interface port and to forward the received packet over a system bus to another switch in a second network interface card through the inter-switch communications port.

2. The apparatus of claim 1, wherein the system bus is a Peripheral Component Interconnect (PCI) bus.

3. The apparatus of claim 1, wherein the system bus is a Peripheral Component Interconnect Express (PCIe) bus.

4. The apparatus of claim 1, wherein upon detecting utilization of the physical network interface is below a threshold, the switch to power down the physical network interface and to redirect the packet over the system bus to another physical network interface.

5. The apparatus of claim 4, wherein upon receiving packets directed to the physical network interface from the plurality of virtual interfaces, the switch to forward the received packets over the system bus through the inter-switch communications port, the another switch to forward the packets to the another physical network interface accessible through the another switch.

6. The apparatus of claim 1, wherein upon receiving a packet from a first virtual interface through a first virtual port for a second virtual interface, the switch to forward the packet through a second virtual interface port to the second virtual interface.

7. The apparatus of claim 1, wherein the switch further comprises:
   a bridging table storing a plurality of entries, each entry storing a destination address and a port identifier.

8. The apparatus of claim 1, wherein upon receiving a packet from a virtual interface through a first virtual port for the physical network interface, the switch to forward the packet through a physical network interface port to the physical network interface.

9. The apparatus of claim 1, wherein the received packet is a network packet that is encapsulated in a system bus packet prior to forwarding over the system bus.

10. A method comprising:
    receiving, by a first network interface card, a packet for a virtual machine through one of a plurality of virtual interfaces sharing a physical network interface; and
    forwarding, by the first network interface card, the received packet over a system bus to a second switch in a second network interface card through an inter-switch communications port in a first switch in the first network interface card.

11. The method of claim 10, wherein the system bus is a Peripheral Component Interconnect (PCI) bus.

12. The method of claim 10, wherein the system bus is a Peripheral Component Interconnect Express (PCIe) bus.

13. The method of claim 10, further comprising:
upon detecting utilization of the physical network interface is below a threshold, powering down the physical network interface; and
redirecting the packet over the system bus to another physical network interface.

14. The method of claim 13, further comprising:
forwarding a packet directed to the physical network interface from the plurality of virtual interfaces over the system bus through the inter-switch communications port to be forwarded to the another physical network interface accessible through the second switch.

15. The method of claim 10, further comprising:
upon receiving a packet from a first virtual interface through a first virtual port for a second virtual interface, forwarding, by the first switch, the packet through a second virtual interface port to the second virtual interface.

16. The method of claim 10, further comprising:
storing a plurality of entries, each entry storing a destination address and a port address.

17. The method of claim 10, further comprising:
upon receiving a packet from a virtual interface through a first virtual port for the physical network interface, forwarding the packet through a physical network interface port to the physical network interface.

18. The method of claim 10, wherein the received packet is a network packet that is encapsulated in a system bus packet prior to forwarding over the system bus.

19. An article including a computer readable storage medium having instructions stored thereon, wherein the instructions, when accessed, results in a machine performing:
receiving, by a first network interface card, a packet for a virtual machine through one of a plurality of virtual interfaces sharing a physical network interface; and
forwarding, by the first network interface card, the received packet over a system bus to a second switch in a second network interface card through an inter-switch communications port in a first switch in the first network interface card.

20. The article of claim 19, wherein the system bus is a Peripheral Component Interconnect Express (PCIe) bus.

21. A system comprising:
an external Ethernet switch;
a first network interface card comprising:
a plurality of virtual interfaces to share a physical network interface through which packets are transferred to the external Ethernet switch, the virtual interfaces to process packets for a virtual machine; and
an embedded switch including an inter-switch communications port, the embedded switch to receive a packet from one of the plurality of virtual interfaces through a virtual interface port and to forward the received packet over a system bus to another embedded switch in a second network interface card through the inter-switch communications port.

22. The system of claim 21, wherein the system bus is a Peripheral Component Interconnect Express (PCIe) bus.

* * * * *